(12) United States Patent
Proefke et al.

(10) Patent No.: US 8,487,743 B2
(45) Date of Patent: Jul. 16, 2013

(54) VALET KEYFOB SYSTEM

(75) Inventors: David T. Proefke, Madison Heights, MI (US); Ingobert K. Lassrich, West Bloomfield, MI (US); Thomas A. Wilson, Rochester Hills, MI (US); Fred W. Huntzicker, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 967 days.

(21) Appl. No.: 12/193,448

(22) Filed: Aug. 18, 2008

(65) Prior Publication Data

US 2010/0039215 A1 Feb. 18, 2010

(51) Int. Cl.
*B60R 25/00* (2006.01)

(52) U.S. Cl.
USPC ............ 340/5.72; 340/5.1; 340/5.6; 340/5.7; 340/5.73; 70/387; 70/388; 70/389

(58) Field of Classification Search
USPC .... 340/5.1, 5.72, 5.64, 5.73, 5.6, 5.7; 70/237, 70/387, 388, 389
See application file for complete search history.

(56) References Cited

U.S. PATENT DOCUMENTS

| | | | | |
|---|---|---|---|---|
| 3,851,505 A | * | 12/1974 | Wilkinson | 70/255 |
| 4,150,415 A | * | 4/1979 | Fichtner | 361/182 |
| 4,898,010 A | * | 2/1990 | Futami et al. | 70/278.1 |
| 5,005,084 A | * | 4/1991 | Skinner | 348/734 |
| 5,146,215 A | * | 9/1992 | Drori | 340/5.22 |
| 5,467,070 A | * | 11/1995 | Drori et al. | 340/426.36 |
| 5,883,443 A | * | 3/1999 | Wilson | 307/10.2 |
| 5,959,540 A | * | 9/1999 | Walter | 340/5.64 |
| 5,982,277 A | * | 11/1999 | Flick | 340/5.21 |
| 6,127,938 A | * | 10/2000 | Friedman | 340/693.6 |
| 6,243,022 B1 | * | 6/2001 | Furukawa | 340/13.31 |
| 6,275,141 B1 | * | 8/2001 | Walter | 340/5.64 |
| 6,386,007 B1 | * | 5/2002 | Johnson et al. | 70/408 |
| 6,389,859 B1 | * | 5/2002 | Paolini et al. | 70/340 |
| 6,426,705 B1 | * | 7/2002 | Wischoeffer | 340/12.27 |
| 6,512,461 B1 | * | 1/2003 | Benzie et al. | 340/5.23 |
| 6,518,882 B2 | * | 2/2003 | Reese et al. | 340/539.1 |
| 6,529,124 B2 | * | 3/2003 | Flick | 340/426.1 |
| 6,546,768 B1 | * | 4/2003 | Burghoff et al. | 70/252 |
| 6,756,885 B1 | * | 6/2004 | Flick | 340/426.1 |
| 6,828,694 B2 | * | 12/2004 | Flick | 307/10.5 |
| 6,897,767 B2 | * | 5/2005 | Kim | 340/426.35 |
| 6,982,632 B2 | * | 1/2006 | Nagasaka et al. | 340/426.3 |
| 7,075,409 B2 | * | 7/2006 | Guba | 340/5.21 |
| 7,098,791 B2 | * | 8/2006 | Okada | 340/568.1 |
| 7,262,683 B2 | * | 8/2007 | Maeda | 340/5.31 |
| 7,375,440 B2 | * | 5/2008 | Suyama et al. | 307/10.2 |
| 7,474,199 B2 | | 1/2009 | Nakashima et al. | |
| 7,504,931 B2 | * | 3/2009 | Nguyen | 340/426.36 |
| 7,545,260 B2 | * | 6/2009 | Schambeck et al. | 340/426.36 |

(Continued)

FOREIGN PATENT DOCUMENTS

CN 101097634 A 1/2008

*Primary Examiner* — Benjamin C Lee
*Assistant Examiner* — Quang D Pham
(74) *Attorney, Agent, or Firm* — Ingrassia Fisher & Lorenz, P.C.

(57) ABSTRACT

A system for activating a predetermined set of vehicle features on a vehicle is provided. The system comprises a valet keyfob in wireless communication with the vehicle and configured to activate the predetermined set of vehicle features when enabled, and a first processor coupled to the vehicle and configured to enable the valet keyfob to activate the predetermined set of vehicle features.

16 Claims, 5 Drawing Sheets

U.S. PATENT DOCUMENTS

| | | | |
|---|---|---|---|
| 7,634,932 B2* | 12/2009 | Cadiz et al. | 70/456 R |
| 7,657,226 B2* | 2/2010 | Gisler | 455/41.2 |
| 7,843,312 B2* | 11/2010 | Eskildsen et al. | 340/5.64 |
| 7,930,915 B2* | 4/2011 | Katagiri | 70/252 |
| 8,138,887 B2* | 3/2012 | Hirano | 340/5.73 |
| 8,237,542 B2* | 8/2012 | Katagiri | 340/5.6 |
| 2003/0016130 A1* | 1/2003 | Joao | 340/539 |
| 2003/0036825 A1* | 2/2003 | Kim | 701/1 |
| 2003/0112149 A1* | 6/2003 | Jarvors | 340/825.72 |
| 2003/0205935 A1* | 11/2003 | Flick | 307/10.1 |
| 2004/0030601 A1* | 2/2004 | Pond et al. | 705/16 |
| 2004/0046452 A1* | 3/2004 | Suyama et al. | 307/10.2 |
| 2004/0048622 A1* | 3/2004 | Witkowski et al. | 455/456.6 |
| 2004/0070516 A1* | 4/2004 | Nielsen | 340/825.72 |
| 2004/0090307 A1* | 5/2004 | Konno | 340/5.62 |
| 2004/0135670 A1* | 7/2004 | Guba | 340/5.21 |
| 2004/0222899 A1* | 11/2004 | Yezersky et al. | 340/825.72 |
| 2004/0227615 A1* | 11/2004 | John et al. | 340/5.61 |
| 2005/0166029 A1* | 7/2005 | Ries et al. | 711/170 |
| 2005/0261816 A1* | 11/2005 | DiCroce et al. | 701/36 |
| 2007/0024117 A1* | 2/2007 | Boenker et al. | 307/9.1 |
| 2007/0229219 A1* | 10/2007 | Nakashima et al. | 340/5.61 |
| 2007/0236341 A1* | 10/2007 | Mackjust et al. | 340/426.13 |
| 2008/0024270 A1* | 1/2008 | Katagiri | 340/5.72 |
| 2008/0127693 A1* | 6/2008 | Cadiz et al. | 70/456 R |
| 2008/0150679 A1* | 6/2008 | Bloomfield | 340/5.7 |
| 2009/0064740 A1* | 3/2009 | Katagiri et al. | 70/237 |
| 2009/0096578 A1* | 4/2009 | Ogino et al. | 340/5.72 |
| 2009/0212905 A1* | 8/2009 | Batz et al. | 340/5.54 |
| 2009/0309696 A1* | 12/2009 | Tsuruta et al. | 340/5.22 |
| 2009/0309697 A1* | 12/2009 | Miller et al. | 340/5.25 |
| 2010/0026503 A1* | 2/2010 | Proefke et al. | 340/601 |
| 2010/0199729 A1* | 8/2010 | Zaitz et al. | 70/237 |

* cited by examiner

VALET KEYFOB SYSTEM

TECHNICAL FIELD

The present invention generally relates to a keyless device used to access vehicle features, and more particularly relates to a device that provides access to a limited set of vehicle features such as those typically required by a valet service.

BACKGROUND OF THE INVENTION

Portable electronic keyfob devices generally provide a driver with convenient, remote, keyless operation of a number of vehicle functions or "features." Most keyfobs operate by sending a wireless signal to a sensor located within the vehicle that activates the specific function chosen by the driver. The features available on a keyfob generally include those commonly used to secure the vehicle from unauthorized use such as remote locking and unlocking of driver or passenger doors or trunk compartments, and remote ignition enablement. They may also include other features aimed primarily at enhancing user convenience such as storage of personal information, automated adjustable seat positioning, or even actuation of an alarm in panic situations. For greater convenience, some systems have been designed to allow passive entry and/or ignition via enablement from a master keyfob.

In some circumstances however, it may be advantageous to limit the quantity and scope of vehicle features accessible through a keyfob. For example, when using a valet service, drivers routinely surrender possession of a master keyfob capable of providing information and activating a plurality of features not required for the service. These may include access to lockable storage areas such as the trunk that, for security purposes, a driver may not wish to relinquish control over. Further, because keyfobs may have an ornate, jewelry-like design that includes a vehicle logo, owners may enjoy displaying them to associates as an example of vehicle quality or to showcase their pride of ownership. The temporary possession and limited function associated with a valet service therefore can be adequately served using a much less decorative and functionally versatile keyfob.

It is desirable therefore to provide a keyfob system that includes a secondary keyfob that provides keyless access to a limited set of vehicle features. It is also desirable to have a keyfob that is enabled to activate vehicle features only when needed, and that may safely remain in the vehicle when not in use. It is further desirable to have a keyfob that is feature programmable for customized use. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In accordance with an embodiment, by way of example only, a system for activating a predetermined set of vehicle features on a vehicle is provided. The system comprises a valet keyfob in wireless communication with the vehicle and configured to activate the predetermined set of vehicle features when enabled, and a first processor coupled to the vehicle and configured to enable the valet keyfob to activate the predetermined set of vehicle features.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description. For convenience of explanation, the invention is described herein for the case of a keyfob used to control various aspects or "features" of a vehicle. But the invention is not limited to such a device and may be incorporated in portable phones, personal digital assistants (PDA), micro-computers, digital watches, digital audio file players (e.g., MP3 or MP4 players), digital video and/or DVD players, and other portable electronic devices. Accordingly, as used herein, the terms "keyfob" and/or "electronic device" are intended to include these and other portable electronic apparatus, irrespective of whether or not it includes a through-hole for attachment of a key. For the purposes of the present invention it does not matter what other electronic functions may be performed by the "keyfob" or "electronic device" of the present invention, provided that it incorporates one or more of the various embodiments described herein.

Figure 1:
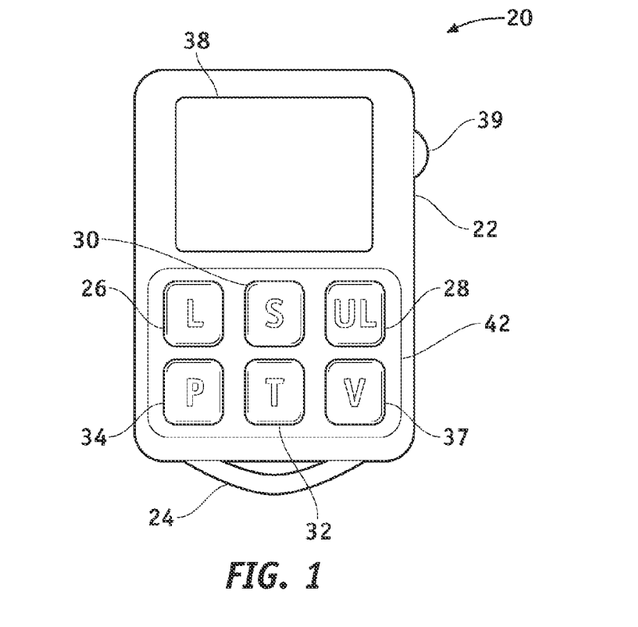
FIG. 1 is a plan view of a master keyfob having a valet function in accordance with a first exemplary embodiment.

FIG. 1 is a plan view of a keyfob 20, hereinafter referred to as the "master" keyfob, having a valet mode function in accordance with a first exemplary embodiment. Master keyfob 20 comprises a housing 22 having a closed-loop fixture 24 for conventional attachment to a keychain. An interface 42 comprising a plurality of buttons is provided for convenient user activation of various vehicle features and may include, for example, a door lock (L) button 26, a door unlock (UL) button 28, a remote start (S) button 30, a trunk unlock (T) button 32, a panic (P) button 34, and a valet mode (V) button 37. Master keyfob 20 further comprises an optional display (e.g., a liquid crystal display) 38 that may visually represent an owner's personal information or information relating to the status of a vehicle (or vehicles) associated therewith. This information may include the vehicle's mileage, tire pressure, location, current fuel level, radio station settings, door lock status, and the like. A scroll wheel 39 may be mounted on a side of housing 22 and utilized to peruse such data. For example, a user may rotate scroll wheel 39 to navigate between vehicular features and depress scroll wheel 39 to select a desired feature and/or view status information.

Figure 2:
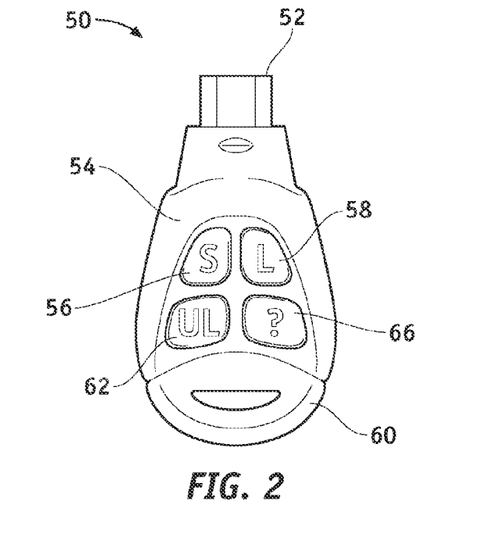
FIG. 2 is schematic diagram illustrating the front of a valet keyfob in accordance with an exemplary embodiment.

FIG. 2 is a schematic illustration of a second keyfob 50, hereinafter known as a "valet" keyfob, in accordance with an exemplary embodiment. The valet keyfob 50 comprises a housing 54 that may have a closed-loop fixture 60 integrated into its base for attachment to a key ring or chain. Valet keyfob 50 includes a fixture 52 such as, for example, a standard USB plug that may be coupled with a receptacle disposed in the vehicle wherein valet keyfob 50 may be conveniently stowed when not in use. Valet keyfob 50 as shown contains a set of buttons for prompting wireless activation of a predetermined set of vehicle features that may include but is not limited to: a door unlock (UL) button 62, a door lock (L) button 58, and a remote start (S) button 56 for enabling vehicle ignition. An additional utility (?) button 66 may also be included for activating an optional additional feature chosen at user discretion in a manner further described below.

Figure 3:
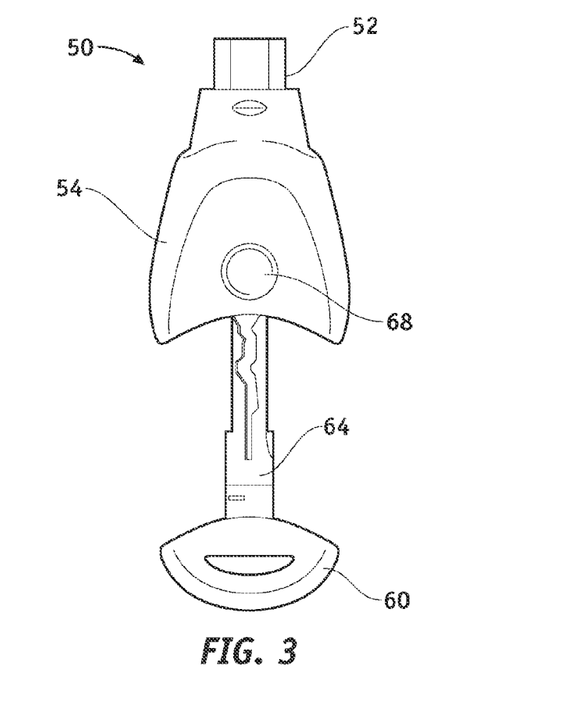
FIG. 3 is a schematic diagram illustrating the rear of a valet keyfob in accordance with an exemplary embodiment.

FIG. 3 schematically illustrates the reverse side of valet keyfob 50 in accordance with an exemplary embodiment. A mechanical bladed key 64 fitted for the ignition lock and/or a door lock may be encased and latched within body 54 for use when needed such as when wireless activation is inoperative. Bladed key 64 may be released by a button 68 accessible through the reverse side of body 54. Valet keyfob 50 is designed for specialized use as will be described in further detail below, and may generally be enabled to activate fewer, and possibly different, vehicle features than master keyfob 20.

Figure 4:
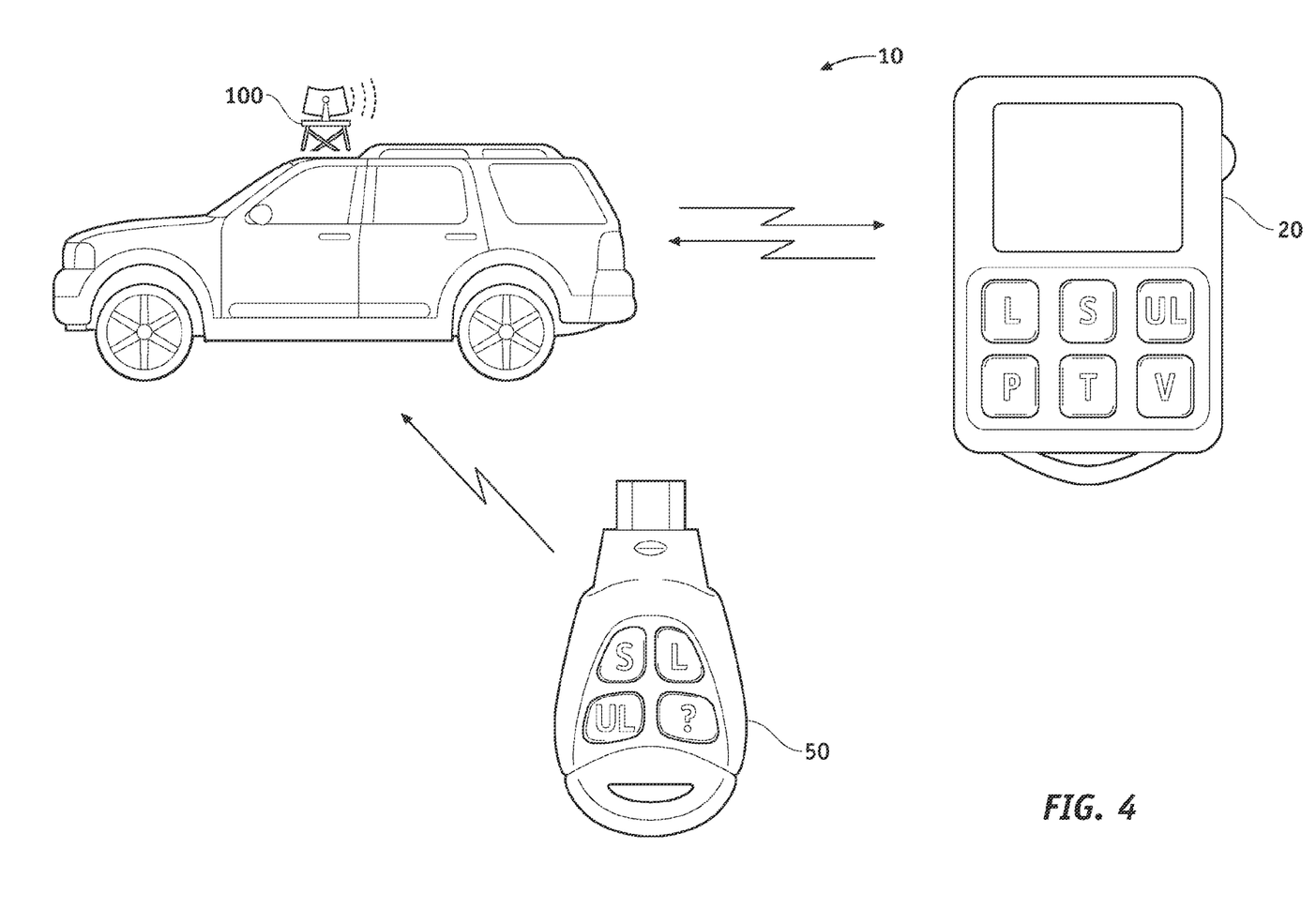
FIG. 4 is a diagram of the components of a vehicular keyfob system to be used in conjunction with the keyfobs shown in FIGS. 1-3.

A schematic diagram of valet system 10 is illustrated in FIG. 4, and depicts a manner in which its various subcomponents interact in accordance with an exemplary embodiment. Valet system 10 is comprised of a vehicle system 100, master keyfob 20, and valet keyfob 50, and is configured to provide a temporary user (such as a valet) with a secondary or valet keyfob for wireless activation of a limited, predetermined set of vehicle features. The availability of valet keyfob 50 allows the vehicle owner to retain possession of the primary or master keyfob 20 enabled with a primary, more complete set of vehicle features. As used herein, the term "enabled" as applied to a keyfob (master or valet) means that user-prompted commands transmitted therefrom are recognized and exercised by vehicle system 100. For example, if a user depresses the door lock (L) button 58 (FIG. 2) on valet keyfob 50 when enabled, vehicle system 100 will respond by activating the door locking function. However, if valet keyfob system 50 is not enabled, or is disabled, vehicle system 100 will take no action.

Referring again to FIG. 4, vehicle system 100 is configured to interact in a well-know manner with master keyfob 20 and receive therefrom user-prompted wireless commands to activate a primary set of vehicle features such as those depicted in FIG. 1. Vehicle system 100 may respond to master keyfob 20 by relaying a variety of vehicle and/or personal information. Further, communication between system 100 and master keyfob 20 is continuously enabled and provides a user thereof with on-command access to vehicle features without need for a specific enabling signal or command. Similarly, vehicle system 100 interacts with valet keyfob 50 by receiving wireless commands therefrom to activate a predetermined set of vehicle features. However, as will be described in further detail below, vehicle system 100 responds to such commands only when valet keyfob 50 is enabled. In one exemplary embodiment, valet keyfob 50 may become enabled via a signal generated within vehicle system 100. In a further embodiment, master keyfob 20, when located within a predetermined distance of vehicle system 100, may enable valet keyfob 50 by transmitting a signal that causes vehicle system 100 to become responsive to vehicle feature commands from valet keyfob 50.

Figure 5:
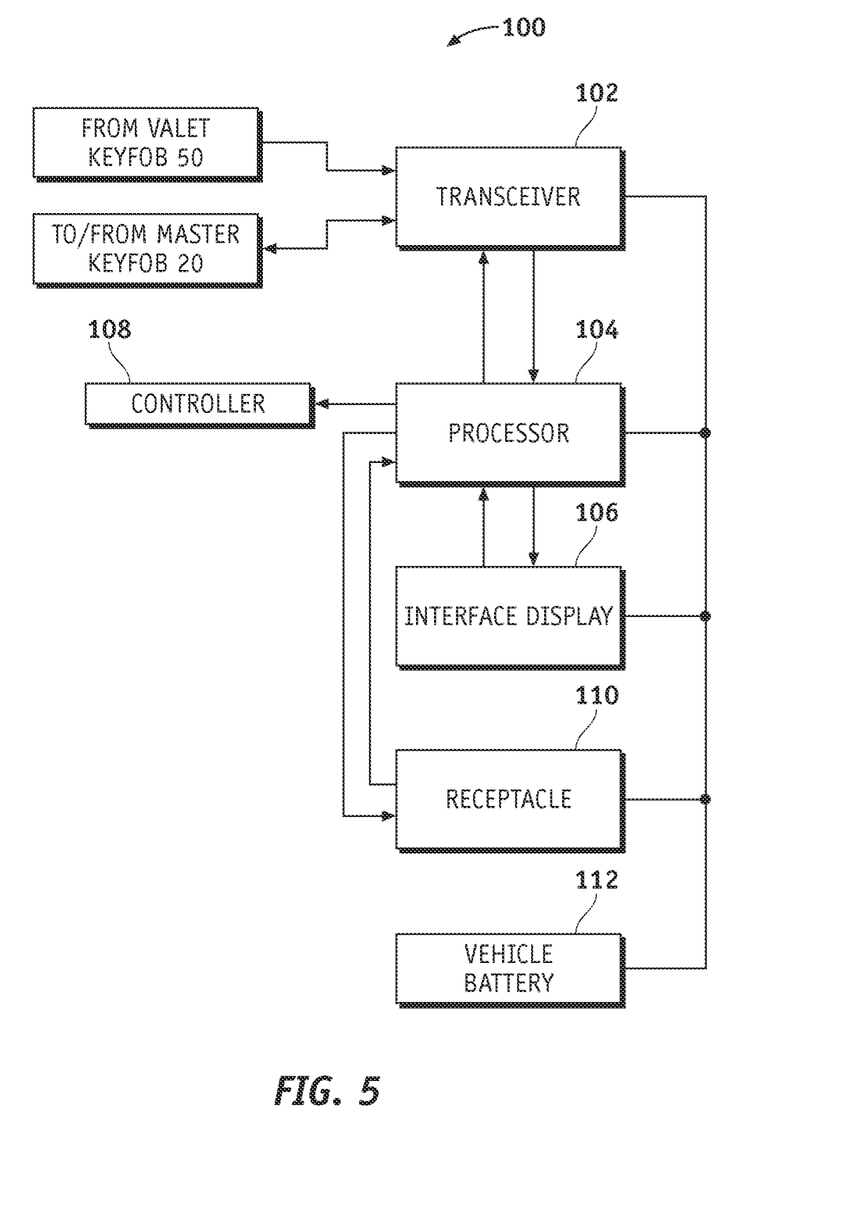
FIG. 5 is a block diagram depicting components of an exemplary vehicle system to be used in conjunction with the keyfob system depicted in FIG. 4.

FIG. 5 is a block diagram illustrating the various components of vehicle system 100 including their interactions with master keyfob 20 and valet keyfob 50 in accordance with an exemplary embodiment. System 100 comprises a processor 104 in communication with a transceiver 102, an interface/display 106, and a controller 108, and receives power from a battery 112. Processor 104 receives user-prompted commands from master keyfob 20 or valet keyfob 50 via transceiver 102 and, if the commanding keyfob is enabled, dispatches these commands to controller 108 for feature activation. Processor 104 may also transmit vehicle status signals to master keyfob 20 via transceiver 102. A user may interact with processor 104 via interface/display 106 to conduct feature programming of valet keyfob 50 and/or access vehicle information. In an exemplary embodiment, a user may program activation of least one feature among a set of vehicle features available for activation by valet keyfob 50 when enabled.

Vehicle system 100 also comprises a receptacle 110 to provide a convenient location for stowing valet keyfob 50 when not in use such as in a glove box or a console recess. Receptacle 110 is compatible with housing 54 (FIG. 2) of valet keyfob 50 and, in one exemplary embodiment, may furnish power for charging a battery. In a further embodiment, enablement of valet keyfob 50 is requested only when it is removed from receptacle 110. Accordingly, processor 104 is configured to detect the presence of valet keyfob 50 in receptacle 110, and is further configured to disable valet keyfob 50 when it is plugged into receptacle 110. Valet keyfob 50 may be detected in receptacle 110 via either a microswitch, or via a capacitive, optical, or inductive sensor, or other means.

Figure 6:
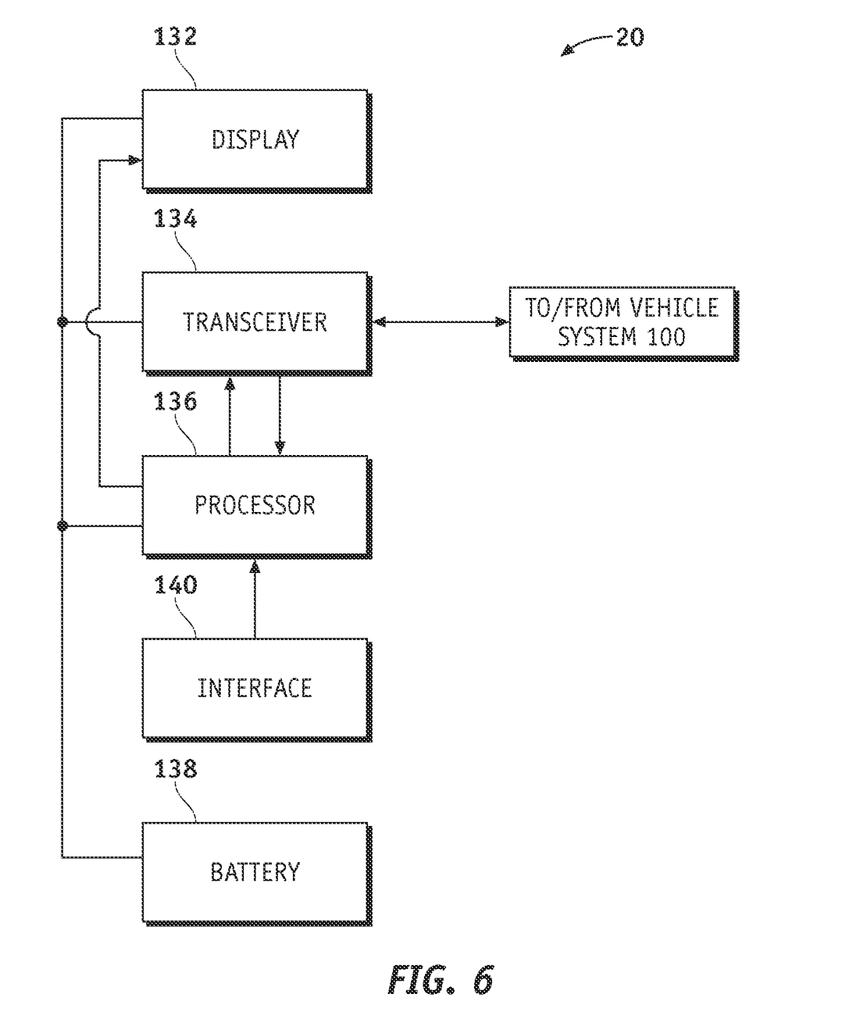
FIG. 6 is a block diagram depicting components of an exemplary master keyfob to be used in conjunction with the keyfob system depicted in FIG. 4.

FIG. 6 is a block diagram illustrating the various components of master keyfob 20 including their interactions with vehicle system 100 in accordance with an exemplary embodiment. Master keyfob 20 comprises a processor 136 operatively coupled to a transceiver 134, a user display 132, and an interface 140. That is, processor 136 receives input commands from a user via interface 140 to activate vehicle features, and relays these requests to transceiver 134 for transmission to vehicle system 100. Processor 136 is coupled to a display 132 whereby conveniently formatted vehicle and/or personal information received through transceiver 134, may be displayed to a user. A battery 138, which may be rechargeable, is coupled to components of master keyfob 20 to provide power. In another exemplary embodiment, master keyfob 20 may send an enabling signal to vehicle processor 104 (FIG. 5) which responds by enabling valet keyfob 50 to activate a predetermined set of vehicle features. Master keyfob 20 may provide this wireless enabling signal to vehicle processor 104 in either of two instances: 1) actively, when a user depresses a valet mode button 37 (FIG. 1) or, 2) passively, when vehicle transceiver 102 and master keyfob 20 are within a predetermined distance, and valet keyfob 50 is removed from vehicle receptacle 110. In the latter instance, vehicle transceiver 102 transmits a prompting signal to master keyfob 20 which responds with a signal sent through transceiver 102 to vehicle processor 104 enabling valet keyfob 50. In a further embodiment, master keyfob 20 may transmit a disabling signal, activated through interface 140, to vehicle processor 104 to disable valet keyfob 50. Signals sent by master keyfob 20 may be encoded to identify their source to a recipient vehicle processor.

Figure 7:
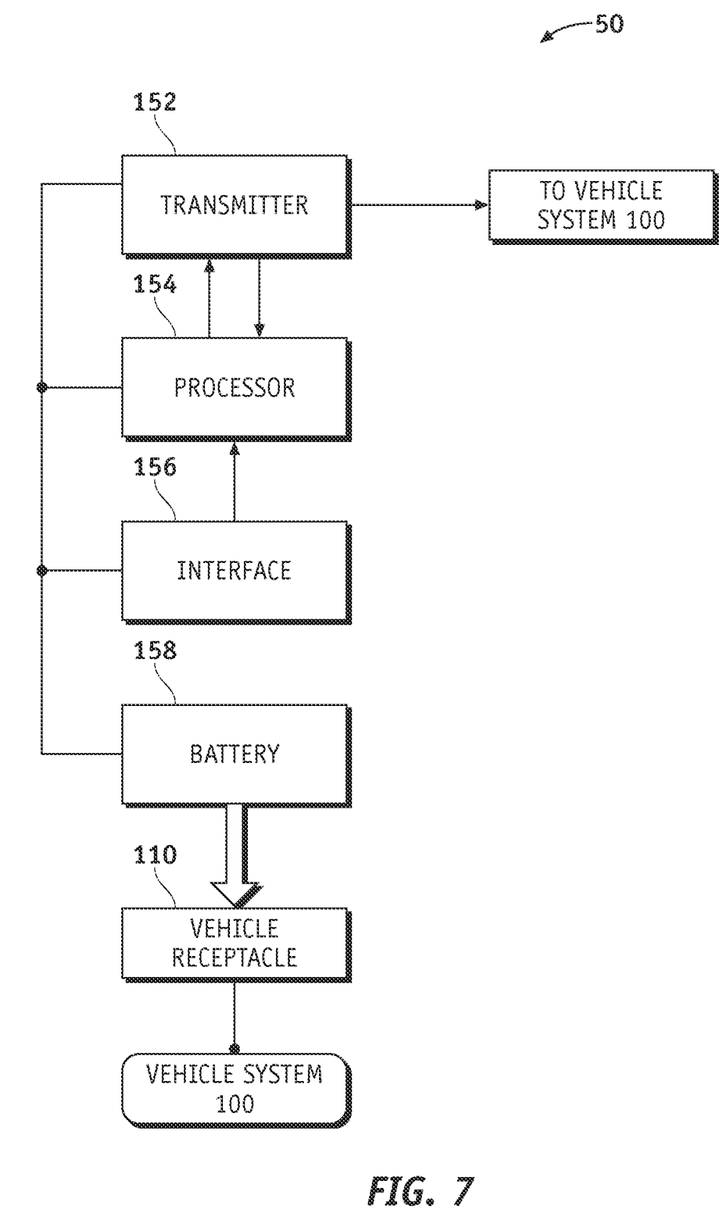
FIG. 7 is a block diagram depicting components of an exemplary valet keyfob to be used in conjunction with the keyfob system depicted in FIG. 4.

FIG. 7 is a block diagram illustrating the various components of valet keyfob 50 including interactions thereof with vehicle system 100 and master keyfob 20. Valet keyfob 50 comprises a processor 154, a transmitter 152, an interface 156, and a battery 158. User-prompted commands to activate vehicle features are entered through interface 156 and relayed to processor 154. These commands are dispatched via transmitter 152 to vehicle transceiver 102 for activation by vehicle system 100. A battery 158, which may be rechargeable, provides components of valet keyfob 50 with electrical power. As previously described, valet keyfob 50 may include a plug 52 (FIG. 2) for interacting with receptacle 110 (FIG. 4) of vehicle system 100 to provide a convenient storage location thereby. In one exemplary embodiment, battery 158 is rechargeable via receptacle 110. In a further embodiment, receptacle 110 uses inductive coupling to recharge battery 158.

Valet keyfob 50 may be used to activate a predetermined set of vehicle features only if it is enabled. In accordance with an exemplary embodiment, enablement requires that valet keyfob 50 first be removed from receptacle 110, and subsequently that a signal of enablement be generated in either of the following three ways: 1) actively, from vehicle system 100 when a user activates an enabling command using the vehicle interface 106 (FIG. 5), 2) actively, from master keyfob 20 through activation of a valet mode button 37 (FIG. 1), or 3) passively, from master keyfob 20 when it is within a predetermined distance from vehicle system 100 and valet keyfob 50 has been removed from receptable 110. Processor 104 may then respond to signals transmitted from valet keyfob 50 to activate the predetermined set of vehicle features. Valet keyfob 50 may be enabled to activate at least one vehicle feature in addition to the predetermined set that is programmed at user discretion via either vehicle interface 106 (FIG. 5), or master keyfob interface 140 (FIG. 6). Once enabled, valet keyfob 50 may command the predetermined set of vehicle features in addition to any user-programmed features. In another embodiment, enabling signals originating from master keyfob 20 or vehicle system 100 are encrypted using a system of encryption such as, for example, Advanced Encryption Standard (AES), or the like. In a further embodiment, transmissions originating from valet keyfob 50 may also be encoded to identify them to vehicle processor 104 (FIG. 5) as to their source.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A system for activating a predetermined set of vehicle features on a vehicle, the system comprising:
    a valet keyfob in wireless communication with the vehicle and configured to selectively activate the predetermined set of vehicle features when enabled,
    a receptacle deployed in the vehicle for storing the valet keyfob; and
    a first processor configured to detect when the valet keyfob is stored in the receptacle and to disable the valet keyfob when the valet keyfob is detected in the receptacle and further to selectively enable the valet keyfob to selectively activate the predetermined set of vehicle features when the valet keyfob is removed from the receptacle in the vehicle.

2. The system of claim 1, wherein the first processor is deployed in the vehicle.

3. The system of claim 1, wherein the first processor is further configured to enable the valet keyfob to activate at least one additional vehicle feature not included in the predetermined set of vehicle features.

4. The system of claim 2, further comprising a master keyfob in wireless communication with the first processor, the master keyfob comprising a second processor configured to transmit a command to the first processor prompting the first processor to enable the valet keyfob.

5. The system of claim 1, wherein a master keyfob is configured to transmit a signal to enable the valet keyfob when the valet keyfob is removed from the receptacle in the vehicle and when the distance between the master keyfob and the vehicle is less than a predetermined distance.

6. The system of claim 1, further comprising a master keyfob in wireless communication with the vehicle, the master keyfob configured to activate a primary set of vehicle features that includes at least the predetermined set of vehicle features.

7. The system of claim 6, wherein the primary set contains more features than does the predetermined set.

8. The system of claim 1, wherein the first processor is configured to encrypt a signal enabling the valet keyfob.

9. The system of claim 1, wherein a master keyfob in wireless communication with the first processor and the master keyfob is configured to transmit a signal to enable the valet keyfob when the valet keyfob is removed from the receptacle and when a valet keyfob activation button is activated on the master keyfob.

10. The system of claim 1, wherein the valet keyfob further comprises a rechargeable battery, and the receptacle further comprises a battery charger.

11. A system for wireless activation of a predetermined set of vehicle features for a vehicle having a processor, the system comprising:
    a valet keyfob in wireless communication with the processor and configured to selectively activate the predetermined set of vehicle features when enabled;
    a receptacle coupled to the vehicle and configured to store the valet keyfob; and
    a master keyfob in wireless communication with the processor and configured to transmit a signal to the processor to selectively enable the valet keyfob to activate the predetermined set of vehicle features when the valet keyfob is removed from the receptacle, wherein the processor is configured to detect when the valet keyfob is stored in the receptacle and to disable the valet keyfob when the valet keyfob is detected in the receptacle.

12. The system of claim 11, wherein the master keyfob is configured to encrypt the signal.

13. The system of claim 11, wherein the master keyfob is further configured to activate a primary set of vehicle features, and wherein the predetermined set of vehicle features contains fewer features than the primary set of vehicle features.

14. The system of claim 11, wherein the master keyfob is configured to transmit the signal to the processor to enable the valet keyfob when the valet keyfob is removed from the receptacle and the distance between the master keyfob and the vehicle is less than a predetermined distance.

15. The system of claim 11, wherein the master keyfob is configured to transmit the signal to the processor to enable the valet keyfob when the valet keyfob is removed from the receptacle and a valet keyfob activation button is pressed on the master keyfob.

16. A system for wireless activation of a predetermined set of vehicle features for a vehicle having a processor, the system comprising:
- a valet keyfob in wireless communication with the vehicle and configured to, when enabled, selectively activate the predetermined set of vehicle features containing fewer features than a primary set of vehicle features, and wherein the predetermined set of vehicle features comprises at least one feature not contained in the primary set of vehicle features;
- a receptacle coupled to the vehicle, configured to store the valet keyfob;
- a master keyfob in wireless communication with the processor and configured to selectively activate the primary set of vehicle features, and to transmit a signal to the processor that selectively enables the valet keyfob to activate at least one of the predetermined set of vehicle features when the valet keyfob is removed from the receptacle, wherein the processor is configured to detect when the valet keyfob is stored in the receptacle and to disable the valet keyfob when the valet keyfob is detected in the receptacle.

* * * * *